(12) United States Patent
Lee

(10) Patent No.: US 8,126,989 B2
(45) Date of Patent: Feb. 28, 2012

(54) DEVICE AND METHOD FOR MANAGING INFORMATION DATA IN A MOBILE TELEPHONE

(75) Inventor: Jong-Phil Lee, Taegukwangyok-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1368 days.

(21) Appl. No.: 10/686,719

(22) Filed: Oct. 17, 2003

(65) Prior Publication Data

US 2005/0010656 A1 Jan. 13, 2005

(30) Foreign Application Priority Data

Oct. 21, 2002 (KR) ................................. 2002-64249

(51) Int. Cl.
G06F 15/16 (2006.01)
(52) U.S. Cl. ........ 709/219; 709/223; 709/227; 709/228; 715/864; 715/867; 715/810; 715/811
(58) Field of Classification Search .................. 709/223, 709/227–228, 219; 715/864, 867, 810–811
See application file for complete search history.

(56) References Cited

U.S. PATENT DOCUMENTS

| | | | | |
|---|---|---|---|---|
| 5,956,487 A * | 9/1999 | Venkatraman et al. | ....... | 709/218 |
| 6,519,241 B1 * | 2/2003 | Theimer | ....... | 370/338 |
| 6,563,800 B1 * | 5/2003 | Salo et al. | ...... | 370/264 |
| 6,993,568 B1 * | 1/2006 | Hauduc et al. | ........ | 709/217 |
| 7,002,703 B2 * | 2/2006 | Parry | ............ | 358/1.15 |
| 7,032,003 B1 * | 4/2006 | Shi et al. | ....... | 709/203 |
| 2002/0173877 A1 * | 11/2002 | Zweig | ........... | 700/245 |
| 2003/0195952 A1 * | 10/2003 | Henry et al. | ........ | 709/220 |
| 2003/0200301 A1 * | 10/2003 | Trzcinko et al. | ....... | 709/223 |

FOREIGN PATENT DOCUMENTS

WO WO 99/56447 11/1999

* cited by examiner

*Primary Examiner* — Yves Dalencourt
*Assistant Examiner* — Michael C Lai
(74) *Attorney, Agent, or Firm* — Roylance, Abrams, Berdo & Goodman L.L.P.

(57) ABSTRACT

A device and method for managing information data in a mobile IP-based mobile telephone. The device and method employ an embedded web server for displaying a homepage of the mobile telephone on a web browser when linked to the mobile telephone through the web browser; and a program of server driven by the embedded web server to generate a command to enable communication between the mobile telephone and a telecommunication system using the web browser and to transmit a message confirming that data updated in the web browser has been updated in the mobile telephone to the web browser. The homepage of the mobile telephone is adapted to display information management menus of the mobile telephone and includes a language pack that stores at least one language so that the information management menus can be displayed in any selected language. The system and method further employ a memory for storing data of the information management menus.

17 Claims, 4 Drawing Sheets

DEVICE AND METHOD FOR MANAGING INFORMATION DATA IN A MOBILE TELEPHONE

PRIORITY

This application claims priority under 35 U.S.C. § 119 to an application entitled "Device and Method for Managing Information Data in a Mobile Telephone" filed in the Korean Intellectual Property Office on Oct. 21, 2002 and assigned Serial No. 2002-64249, the contents of which are incorporated herein by reference.

BACKGROUND OF THE INVENTION

1. Field of the Invention

The present invention relates to a device and a method for managing information data, and more particularly, to a device and a method for managing information data in a mobile IP-based mobile telephone through an Internet web browser.

2. Description of the Related Art

FIG. 1 shows the known format for managing information data in a mobile telephone. As shown in FIG. 1, a window application, such as PCLink, GSM or Wizard, has generally been used to change any information in a mobile telephone. However, since IrDa, serial cable, bluetooth or the like is required to run a window application, it is possible to change any information in the mobile telephone only at a short distance. Also, whenever a new model of mobile telephone is produced, the window application should be changed, thereby increasing the cost from the stage of development. Therefore, the known technique cannot accommodate users with regard to new operating systems that are introduced upon development of new mobile telephones.

SUMMARY OF THE INVENTION

Accordingly, the embodiments of the present invention described herein have been made to substantially solve the above-mentioned problems occurring in the known devices. Hence, an object of the present invention is to provide a device and a method for managing information data in a mobile IP-based mobile telephone through an Internet web browser.

In order to substantially accomplish this object and other objects, the embodiments of the present invention provide an improved device for managing information data in a mobile IP-based mobile telephone. The device comprises an embedded web server for displaying a homepage of the mobile telephone on a web browser when linked to the mobile telephone through the web browser; a program of server driven by the embedded web server to generate a command for communication between the mobile telephone and a telecommunication system using the web browser and to transmit a message confirming that data updated in the web browser has been updated in the mobile telephone to the web browser; a homepage of the mobile telephone for displaying information management menus of the mobile telephone and including a language pack storing at least one language so that the information management menus can be displayed in a selected language; and a memory for storing data of the information management menus.

Another embodiment of the present invention provides an improved method for managing information data in a mobile IP-based mobile telephone. The method comprises the steps of accessing the mobile telephone through an Internet web browser; displaying a homepage of the mobile telephone on the web browser; selecting a language at the homepage displayed on the web browser; displaying information management menus in the selected language; displaying data of the selected menu on the web browser when one menu is selected from the information management menus; updating the same data in the mobile telephone when the data is updated in the web browser; and transmitting a message of successful update to the web browser.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
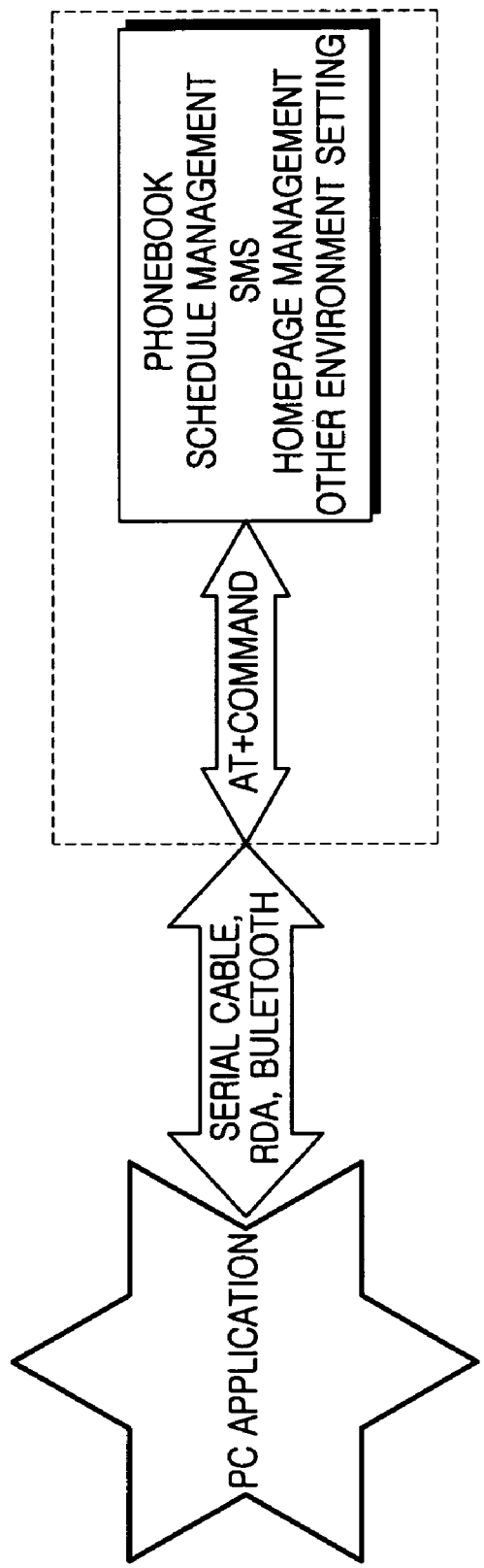
FIG. 1 shows an example of a known format for managing information data in a mobile telephone.

Hereinafter, certain embodiments of the present invention will be described with reference to the accompanying drawings. In the drawings, the same element, although depicted in different drawings, will be designated by the same reference numeral or character. Also, in the following description of the present invention, a detailed description of known functions and configurations incorporated herein will be omitted for conciseness.

Figure 2:
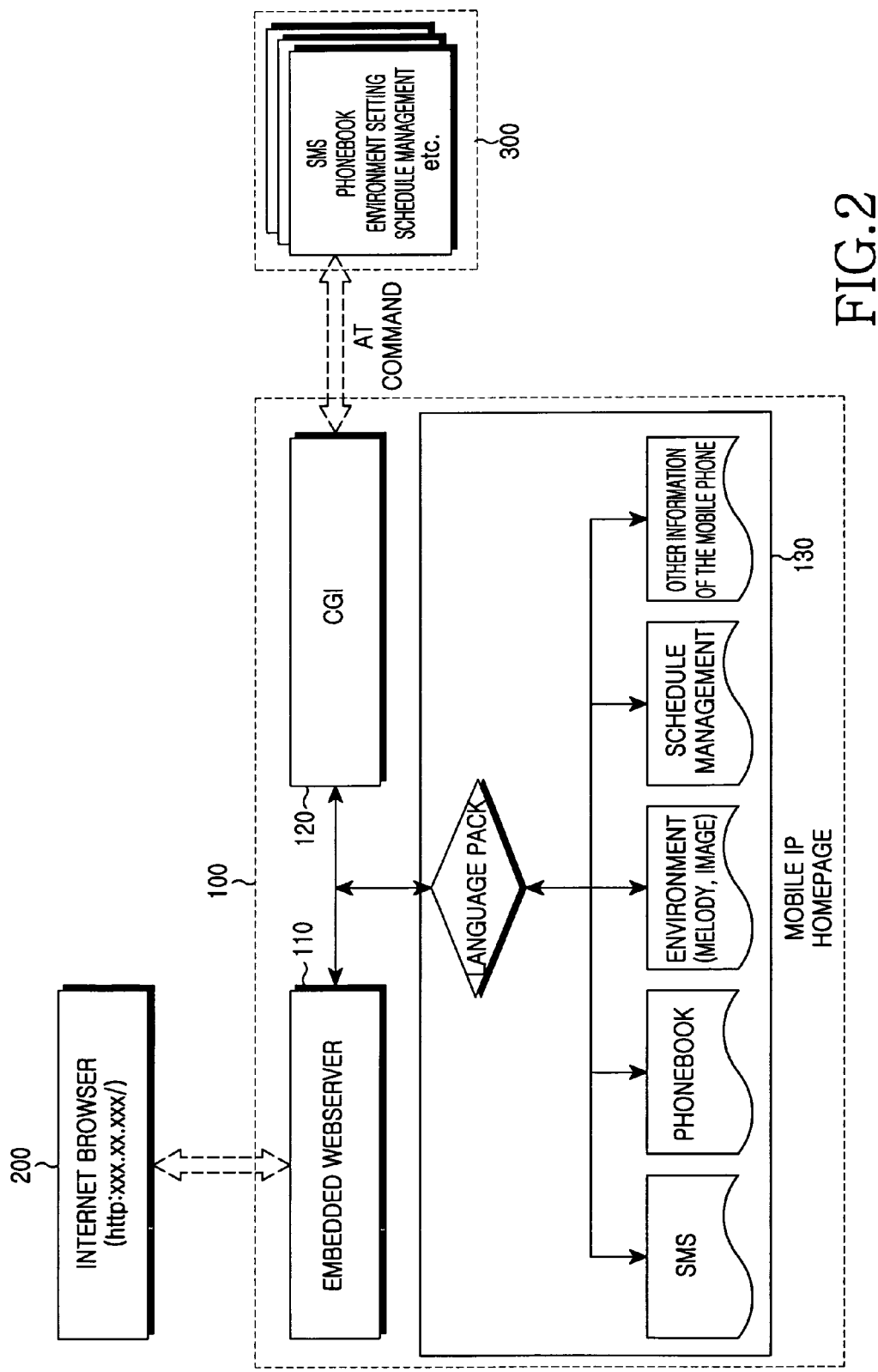
FIG. 2 shows an example of the operating principle of a mobile IP-based mobile telephone according to an embodiment of the present invention.
Figure 3:
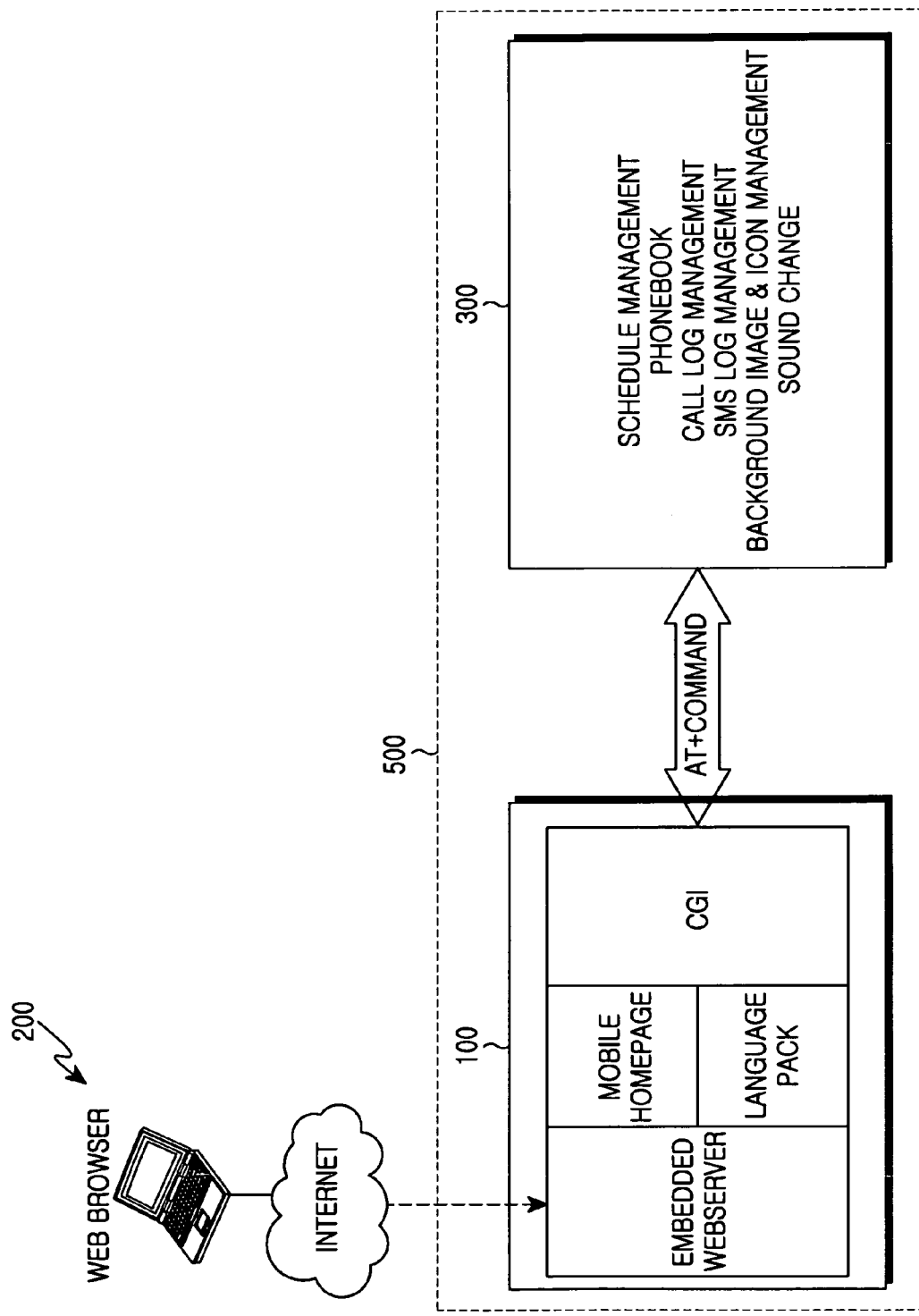
FIG. 3 shows an example of a construction of a mobile IP-based mobile telephone according to an embodiment of the present invention and a web browser.

FIG. 2 shows an example of an operating principle of a mobile IP-based mobile telephone according to an embodiment of the present invention. FIG. 3 shows an example of a construction of a mobile IP-based mobile telephone according to an embodiment of the present invention and a web browser.

Referring to FIGS. 2 and 3, the mobile IP-base mobile telephone includes a device 100 for managing information data, and a memory 300 for storing the information data, including such data as letter messages, a phonebook and a setting (melody, image, and so on). The information data management device 100 comprises an embedded web server 110, a program of server 120 and a homepage 130 for displaying menus of the information data of the mobile telephone.

The embedded web server 110, when linked to a mobile IP-based mobile telephone 500 through an Internet web browser 200, displays the homepage 130 of the mobile telephone on the web browser 200. Also, the embedded web server 110 drives the program of server 120 to generate a standard command enabling communication between the mobile telephone 500 and a telecommunication system using the web browser 200, e.g., a computer or a notebook. The command refers to a standard protocol enabling communication between the mobile telephone and a telecommunication system, such as a computer or a notebook computer. The embedded web server 110 fetches information management data requested by a user to the web browser 200. Also, the embedded web server 110 updates any data updated in the web browser 200 in the memory 300 of the mobile telephone according to command.

The program of server 120 is driven under the control of the embedded web server 110 in order to generate a command enabling communication between the mobile telephone 500 and a telecommunication system using the web browser 200.

In addition, the program of server 120 transmits a message confirming whether the update in the mobile telephone has been successful to the web browser 200 through the embedded web server 110. The program of server 120 includes a CGI program and an ASP program. Hereinafter, in the description of certain embodiments of the present invention, the program of server will be described assuming that it is a CGI program.

The homepage 130 of the mobile telephone is displayed on the web browser 200 under the control of the embedded web server 110. The homepage 130 displays information management menus stored in the memory 300 of the mobile telephone. The homepage 130 includes a language pack which stores at least one language for displaying the information management menus.

Figure 4:
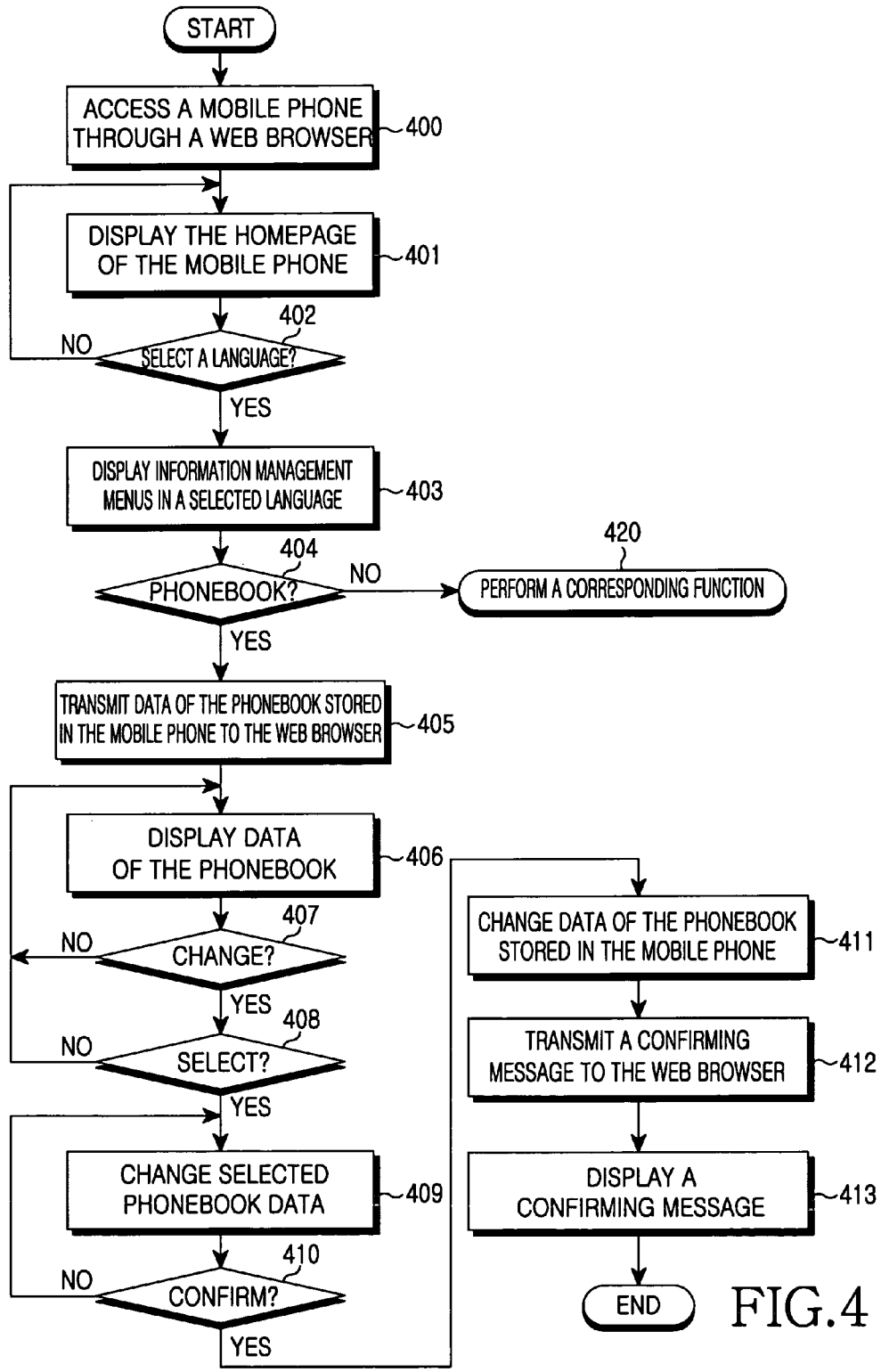
FIG. 4 is a flow chart showing an example of a process of managing information data in a mobile IP-based mobile telephone according to an embodiment of the present invention.

FIG. 4 is a flow chart showing an example of a process of managing information data in a mobile IP-based mobile telephone according to an embodiment of the present invention. Hereinafter, embodiments of the present invention will be described in more detail with reference to FIGS. 2 through 4.

In step 400, the user can input a website address (http://xxx.xx.xxx/) of the mobile telephone 500 in the web browser 200 to access the mobile telephone 500. In step 401, the embedded web server 110 of the mobile telephone displays the homepage 130 of the mobile telephone on the web browser 200.

If the user selects a language at the displayed homepage 130, the embedded web server 110 will sense this in step 402 and will proceed to step 403. In step 403, the embedded web server 110 displays information management menus stored in the memory 300 of the mobile telephone in the language selected by the user on the web browser 200. If the user selects a phonebook of the mobile telephone from the information management menus (including those for letter messages, phonebook, setting such as melody, image and so on, schedule management and other information of the mobile telephone) in step 403, the embedded web server 110 will sense this at step 404 and will proceed to step 405. If not, the processing will proceed to step 420 where a function corresponding to the menu item selected in step 404.

In step 405, the embedded web server 110 drives the CGI program 120. The CGI program 120 generates a command enabling communication between the mobile telephone 500 and a computer using the web browser 200. In step 406, the embedded web server 110 displays data of the phonebook stored in the memory 300 of the mobile telephone on the web browser 200 according to the command.

If the user changes data of the phonebook displayed on the web browser 200 in step 406, the embedded web server 110 will proceed with step 407 or step 408 for selecting data of the phonebook to be corrected. If the user completes any change to the selected phonebook data in step 409, the embedded web server 110 will sense this in step 410 and will proceed to step 411. In step 411, the embedded web server 110 drives the CGI program 120. The CGI program 120 generates a command for communication between the mobile telephone 500 and a computer using the web browser 200. The embedded web server 110 updates any data updated in the web browser 200 in the memory 300 of the mobile telephone according to the command.

If the data updated in the web browser 200 is updated in the mobile telephone 500, the CGI program 120 will transmit a message confirming whether the update in the memory 300 has been successful to the web browser 200 in step 412. In step 413, the message is transmitted to the web browser 200 by the embedded web server 110 and displayed on the web browser 200 in step 413.

The present invention having the construction and operation as explained above produces advantageous effects. For example, since the present invention manages information data in a mobile telephone using an Internet web browser, the mobile telephone can perform an identical function as performed by a home computer and thereby reduce the cost of wireless telecommunications. Also, the embodiments of the present invention described herein eliminate the necessity of developing a different window application for an operating system of each mobile telephone.

While certain embodiments of the invention have been shown and described, it will be understood by those skilled in the art that various changes in form and details may be made therein without departing from the spirit and scope of the invention as defined by the appended claims and equivalents thereof.

What is claimed is:

1. A device for managing information data in a mobile IP-based mobile telephone, the device comprising:
   an embedded web server, for displaying a homepage of the mobile telephone on a web browser when linked to the mobile telephone through a telecommunication system, driving a common gateway interface (CGI) and/or active server pages (ASP) program to generate a command for communication between the mobile telephone and the telecommunication system using the web browser, displaying data of a selected menu stored in the mobile telephone on the web browser according to the command and updating data on the mobile telephone in accordance with a data updated in the web browser according to the command;
   a CGI and/or ASP program driven by the embedded web server to generate a command for communication between the mobile telephone and the telecommunication system using the web browser, and to transmit a message confirming that data updated in the web browser has been updated in the mobile telephone to the web browser;
   a homepage of the mobile telephone, for displaying information management menus of the mobile telephone and including a language pack storing at least one language so that the information management menus can be displayed in a selected language; and
   a memory, for storing data of the information management menus.

2. The device according to claim 1, wherein said information management menus represent at least one of the following:
   a phonebook, a letter message, a setting including at least one of melody and image, a schedule management and other information of the mobile telephone.

3. The device of claim 1, wherein displaying the homepage of the mobile telephone on a web browser of a telecommunication system further comprises receiving a website address of the mobile telephone in the web browser to access the mobile telephone.

4. A method for managing information data in a mobile IP-based mobile telephone, the method comprising the steps of:
   accessing the mobile telephone through an Internet web browser of a telecommunication system;
   displaying a homepage of the mobile telephone on the web browser;
   selecting a language at the homepage displayed on the web browser;
   displaying information management menus in the selected language;
   when one menu is selected from the information management menus, driving, by an embedded web server of the mobile phone, a common gateway interface (CGI) and/or active server pages (ASP) program of the mobile phone to generate a command enabling communication between the mobile telephone and the telecommunication system, and displaying data of the selected menu stored in the mobile phone on the web browser according to the command;

when the data of said menu is updated in the web browser, driving, by the embedded web server of the mobile phone, the CGI and/or ASP program of the mobile phone to generate a command enabling communication between the mobile telephone and the telecommunication system, and updating the same data updated in the mobile telephone according to the command; and transmitting a message of successful update to the web browser.

5. The method according to claim 4, wherein said step of displaying data of the selected menu on the web browser comprises:

selecting one menu among the information management menus;

driving a common gateway interface/active server pages (CGI and/or ASP) program of server of the mobile telephone by an embedded web server of the mobile telephone;

generating a command by the CGI and/or ASP program of server enabling communication between the mobile telephone and the telecommunication system; and displaying data of the selected data, which is stored in the mobile telephone, on the web browser according to the command.

6. The method according to claim 5, wherein said command includes a standard protocol for communication between the mobile telephone and the telecommunication system using the web browser.

7. The method according to claim 4, wherein said step of updating the data of said menu updated in the web browser in the mobile telephone comprises:

updating the data of said menu in the web browser;

driving a common gateway interface/active server pages (CGI and/or ASP) program of server of the mobile telephone by the embedded web server of the mobile telephone;

generating a command by the CGI and/or ASP program of server enabling communication between the mobile telephone and the telecommunication system; and updating data of the menu updated in the web browser in the mobile telephone according to the command.

8. The method according to claim 7, wherein said command includes a standard protocol for communication between the mobile telephone and the telecommunication system using the web browser.

9. The method according to claim 4, wherein said information management menus represent at least one of the following:

a phonebook, a letter message, a setting including at least one of melody and image, a schedule management and other information of the mobile telephone.

10. The method of claim 4, wherein accessing the mobile telephone comprises receiving a website address of the mobile telephone in the Internet web browser.

11. A non-transitory computer-readable storage medium storing instructions for managing information data in a mobile IP-based mobile telephone, the instructions comprising:

a first set of instructions, for accessing of the mobile telephone through an Internet web browser of a telecommunication system;

a second set of instructions, for displaying of a homepage of the mobile telephone on the web browser;

a third set of instructions, for selecting of a language at the homepage displayed on the web browser;

a fourth set of instructions for displaying of information management menus in the selected language;

a fifth set of instructions for driving, by an embedded web server of the mobile phone, a common gateway interface (CGI) and/or active server pages (ASP) program of the mobile phone to generate a command enabling communication between the mobile telephone and the telecommunication system, and displaying data of the selected menu stored in the mobile phone on the web browser according to the command when one menu is selected from the information management menus;

a sixth set of instructions, when the data of said menu is updated in the web browser, for driving, by the embedded web server of the mobile phone, the CGI and/or ASP program of the mobile phone to generate a command enabling communication between the mobile telephone and the telecommunication system, and updating the same data in the mobile telephone according to the command; and a seventh set of instructions, for transmitting of a message of successful update to the web browser.

12. The non-transitory computer-readable storage medium according to claim 11, wherein said fifth set of instructions is further adapted to enable the following:

selecting of one menu among the information management menus;

driving of a common gateway interface/active server pages (CGI and/or ASP) program of server of the mobile telephone by an embedded web server of the mobile telephone;

generating of a command by the CGI and/or ASP program of server enabling communication between the mobile telephone and the telecommunication system; and displaying of data of the selected data, which is stored in the mobile telephone, on the web browser according to the command.

13. The non-transitory computer-readable storage medium according to claim 12, wherein said command includes a standard protocol for communication between the mobile telephone and the telecommunication system using the web browser.

14. The non-transitory computer-readable storage medium according to claim 11, wherein said sixth set of instructions is further adapted to enable the following:

updating of the data of said menu in the web browser;

driving of the CGI and/or ASP program of server of the mobile telephone by the embedded web server of the mobile telephone;

generating of a command by the CGI and/or ASP program of server enabling communication between the mobile telephone and the telecommunication system; and updating of data of the menu updated in the web browser in the mobile telephone according to the command.

15. The non-transitory computer-readable storage medium according to claim 14, wherein said command includes a standard protocol for communication between the mobile telephone and the telecommunication system using the web browser.

16. The non-transitory computer-readable storage medium according to claim 11, wherein said information management menus represent at least one of the following:

a phonebook, a letter message, a setting including at least one of melody and image, a schedule management and other information of the mobile telephone.

17. The non-transitory computer-readable storage medium according to claim 11, wherein said first set of instructions is further adapted to access the mobile telephone by receiving a website address of the mobile telephone in the Internet web browser of the telecommunication system.

* * * * *